United States Patent
Chin et al.

(10) Patent No.: US 8,315,235 B2
(45) Date of Patent: Nov. 20, 2012

(54) METHODS AND SYSTEMS FOR DECODING BROADCAST PAGING MESSAGES IN WIMAX NETWORKS

(75) Inventors: Tom Chin, San Diego, CA (US); Kuo-Chun Lee, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 617 days.

(21) Appl. No.: 12/367,498

(22) Filed: Feb. 6, 2009

(65) Prior Publication Data
US 2010/0202424 A1    Aug. 12, 2010

(51) Int. Cl.
*H04W 4/00* (2009.01)
(52) U.S. Cl. ........................................ 370/338
(58) Field of Classification Search ............ 370/311, 370/312, 332, 338; 455/404.1
See application file for complete search history.

(56) References Cited

U.S. PATENT DOCUMENTS

| | | |
|---|---|---|
| 6,400,734 B1 | 6/2002 | Weigand |
| 2006/0089161 A1 | 4/2006 | Kim et al. |
| 2007/0115891 A1* | 5/2007 | Kim .............................. 370/332 |
| 2008/0084941 A1 | 4/2008 | Mohanty et al. |
| 2008/0095092 A1* | 4/2008 | Kim .............................. 370/311 |
| 2009/0186595 A1* | 7/2009 | Son et al. ................... 455/404.1 |

OTHER PUBLICATIONS

International Search Report and Written Opinion—PCT/US2010/023938, International Searching Authority—European Patent Office, Nov. 4, 2010.

* cited by examiner

*Primary Examiner* — Albert T Chou
(74) *Attorney, Agent, or Firm* — Tyler Overall (57) ABSTRACT

Embodiments of the present disclosure propose a method for addressing MAC protocol data units which include MOB_PAG-ADV messages in an attempt to improve the success rate of decoding BS broadcast paging messages. For example, certain embodiments propose parsing and continuing to decode MPDUs with MOB_PAG-ADV messages although the corresponding CRC failed.

20 Claims, 8 Drawing Sheets

| | |
|---|---|
| 510 → Message Type = 61 | 1 Byte |
| Num_Paging_Group_IDs | 1 Byte |
| Paging_Group_ID_1 | 2 Bytes |
| Paging_Group_ID_2 | 2 Bytes |
| ⋮ | |
| Paging_Group_ID_M | 2 Bytes |
| Num_MACs | 1 Byte |
| 520 → MAC_Address_Hash_1 | 3 Bytes |
| 522 → Action_Code_1 | 2 Bits |
| Reserved | 6 Bits |
| MAC_Address_Hash_2 | 3 Bytes |
| Action_Code_2 | 2 Bits |
| Reserved | 6 Bits |
| ⋮ | |
| MAC_Address_Hash_N | 3 Bytes |
| Action_Code_N | 2 Bits |
| Reserved | 6 Bits |
| CDMA Code and Transmission Opportunity Assignment | variable if exists |
| Paging Response Window | 3 Bytes if exists |

METHODS AND SYSTEMS FOR DECODING BROADCAST PAGING MESSAGES IN WIMAX NETWORKS

TECHNICAL FIELD

Certain embodiments of the present disclosure generally relate to wireless communication and, more particularly, to paging a mobile station in a low power state.

SUMMARY

Certain embodiments provide a method for processing a Media Access Control Protocol Data Units (MPDU). The method generally includes receiving the MPDU with one or more bit errors, determining if the MPDU contains a base station broadcast paging (MOB_PAG-ADV) message, and attempting to parse the MOB_PAG-ADV message despite the one or more bit errors if it is determined that the MPDU contains a MOB_PAG-ADV message.

Certain embodiments provide an apparatus for processing a Media Access Control Protocol Data Units (MPDU). The apparatus generally includes means for receiving the MPDU with one or more bit errors, means for determining if the MPDU contains a base station broadcast paging (MOB_PAG-ADV) message, and means for attempting to parse the MOB_PAG-ADV message despite the one or more bit errors if it is determined that the MPDU contains a MOB_PAG-ADV message.

Certain embodiments provide an apparatus for processing a Media Access Control Protocol Data Units (MPDU). The apparatus generally includes logic for receiving the MPDU with one or more bit errors, logic for determining if the MPDU contains a base station broadcast paging (MOB_PAG-ADV) message, and logic for attempting to parse the MOB_PAG-ADV message despite the one or more bit errors if it is determined that the MPDU contains a MOB_PAG-ADV message.

Certain embodiments provide a computer-program product for processing a Media Access Control Protocol Data Units (MPDU), including a computer readable medium having instructions stored thereon, the instructions being executable by one or more processors. The instructions generally include instructions for receiving the MPDU with one or more bit errors, instructions for determining if the MPDU contains a base station broadcast paging (MOB_PAG-ADV) message, and instructions for attempting to parse the MOB_PAG-ADV message despite the one or more bit errors if it is determined that the MPDU contains a MOB_PAG-ADV message.

Certain embodiments as presented herein, wherein the action codes are defined by the IEEE 802.16 standard.

BRIEF DESCRIPTION OF THE DRAWINGS

So that the manner in which the above-recited features of the present disclosure can be understood in detail, a more particular description, briefly summarized above, may be had by reference to embodiments, some of which are illustrated in the appended drawings. It is to be noted, however, that the appended drawings illustrate only certain typical embodiments of this disclosure and are therefore not to be considered limiting of its scope, for the description may admit to other equally effective embodiments.

DETAILED DESCRIPTION

Embodiments of the present disclosure propose a method for addressing MAC protocol data units which include MOB_PAG-ADV messages in an attempt to improve the success rate of decoding BS broadcast paging messages. For example, certain embodiments propose parsing and continuing to decode MPDUs with MOB_PAG-ADV messages although the corresponding CRC failed.

OFDM and OFDMA wireless communication systems under IEEE 802.16 use a network of base stations to communicate with wireless devices (i.e., mobile stations) registered for services in the systems based on the orthogonality of frequencies of multiple subcarriers and can be implemented to achieve a number of technical advantages for wideband wireless communications, such as resistance to multipath fading and interference. Each base station (BS) emits and receives radio frequency (RF) signals that convey data to and from the mobile stations (MS).

Under current versions of the IEEE 802.16 standard, a MS may enter a low power state to conserve power when not exchanging data with a BS. Additionally, the MS may periodically power up and listen for paging messages. These paging messages may be broadcast by one or more BSs to a geographic area (or sector) serviced by the BS as a mobile paging advertisement (MOB_PAG-ADV) message. The MOB_PAG-ADV message may be used to request a location update from an MS or to notify the MS of pending downlink (DL) traffic. Unfortunately, the reception and decoding of MOB_PAG-ADV messages by an MS is often hindered as a result of bit errors.

Exemplary Wireless Communication System

The techniques described herein may be used for various broadband wireless communication systems, including communication systems that are based on an orthogonal multiplexing scheme. Examples of such communication systems include Orthogonal Frequency Division Multiple Access (OFDMA) systems, Single-Carrier Frequency Division Multiple Access (SC-FDMA) systems, and so forth. An OFDMA system utilizes orthogonal frequency division multiplexing (OFDM), which is a modulation technique that partitions the overall system bandwidth into multiple orthogonal sub-carriers. These sub-carriers may also be called tones, bins, etc.

With OFDM, each sub-carrier may be independently modulated with data. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA.

One example of a communication system based on an orthogonal multiplexing scheme is a WiMAX system. WiMAX, which stands for the Worldwide Interoperability for Microwave Access, is a standards-based broadband wireless technology that provides high-throughput broadband connections over long distances. There are two main applications of WiMAX today: fixed WiMAX and mobile WiMAX. Fixed WiMAX applications are point-to-multipoint, enabling broadband access to homes and businesses, for example. Mobile WiMAX is based on OFDM and OFDMA and offers the full mobility of cellular networks at broadband speeds.

IEEE 802.16x is an emerging standard organization to define an air interface for fixed and mobile broadband wireless access (BWA) systems. These standards define at least four different physical layers (PHYs) and one media access control (MAC) layer. The OFDM and OFDMA physical layer of the four physical layers are the most popular in the fixed and mobile BWA areas respectively.

Figure 1:
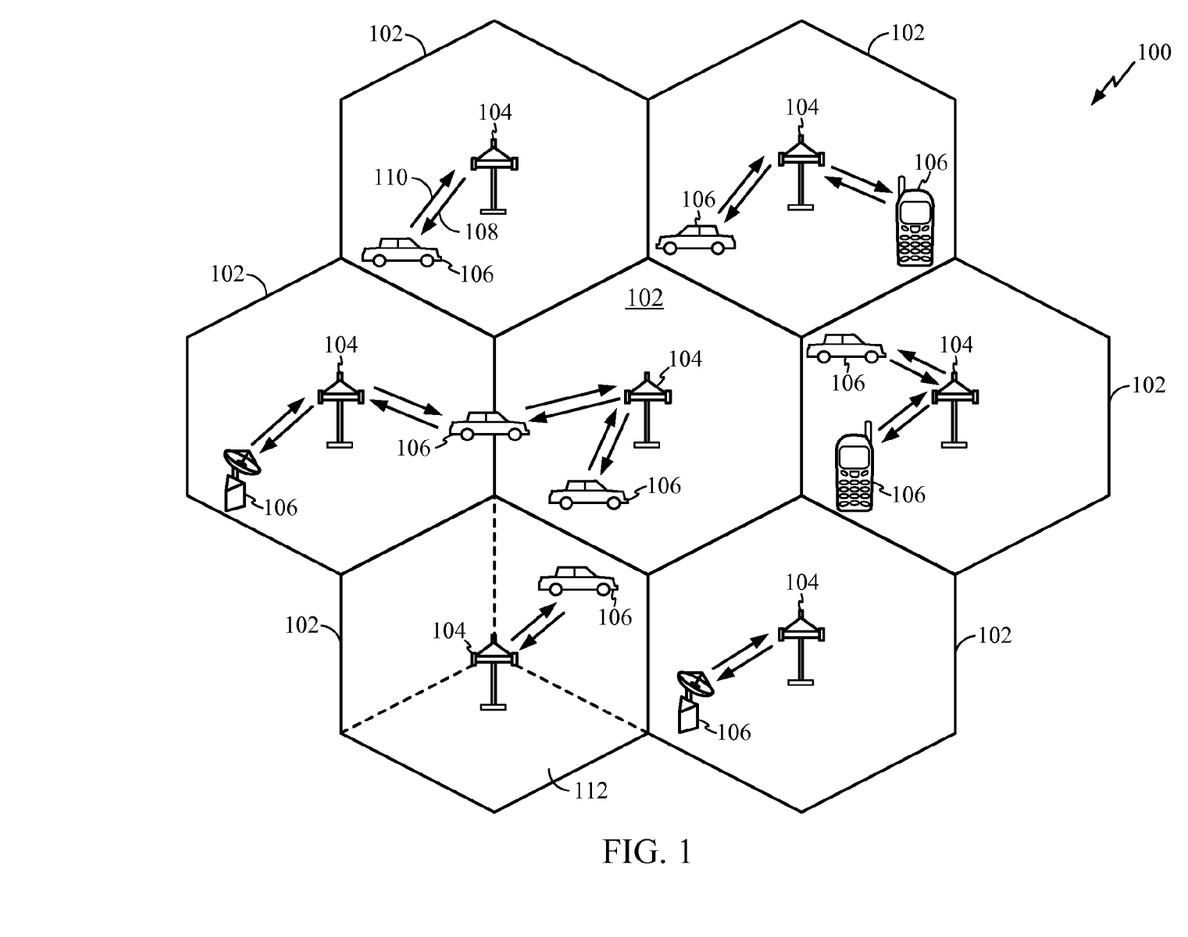
FIG. 1 illustrates an example wireless communication system, in accordance with certain embodiments of the present disclosure.

FIG. 1 illustrates an example of a wireless communication system 100 in which embodiments of the present disclosure may be employed. The wireless communication system 100 may be a broadband wireless communication system. The wireless communication system 100 may provide communication for a number of cells 102, each of which is serviced by a base station 104. A base station 104 may be a fixed station that communicates with user terminals 106. The base station 104 may alternatively be referred to as an access point, a Node B, or some other terminology.

FIG. 1 depicts various user terminals 106 dispersed throughout the system 100. The user terminals 106 may be fixed (i.e., stationary) or mobile. The user terminals 106 may alternatively be referred to as remote stations, access terminals, terminals, subscriber units, mobile stations, stations, user equipment, etc. The user terminals 106 may be wireless devices, such as cellular phones, personal digital assistants (PDAs), handheld devices, wireless modems, laptop computers, personal computers, etc.

A variety of algorithms and methods may be used for transmissions in the wireless communication system 100 between the base stations 104 and the user terminals 106. For example, signals may be sent and received between the base stations 104 and the user terminals 106 in accordance with OFDM/OFDMA techniques. If this is the case, the wireless communication system 100 may be referred to as an OFDM/OFDMA system.

A communication link that facilitates transmission from a base station 104 to a user terminal 106 may be referred to as a downlink 108, and a communication link that facilitates transmission from a user terminal 106 to a base station 104 may be referred to as an uplink 110. Alternatively, a downlink 108 may be referred to as a forward link or a forward channel, and an uplink 110 may be referred to as a reverse link or a reverse channel.

A cell 102 may be divided into multiple sectors 112. A sector 112 is a physical coverage area within a cell 102. Base stations 104 within a wireless communication system 100 may utilize antennas that concentrate the flow of power within a particular sector 112 of the cell 102. Such antennas may be referred to as directional antennas.

Figure 2:
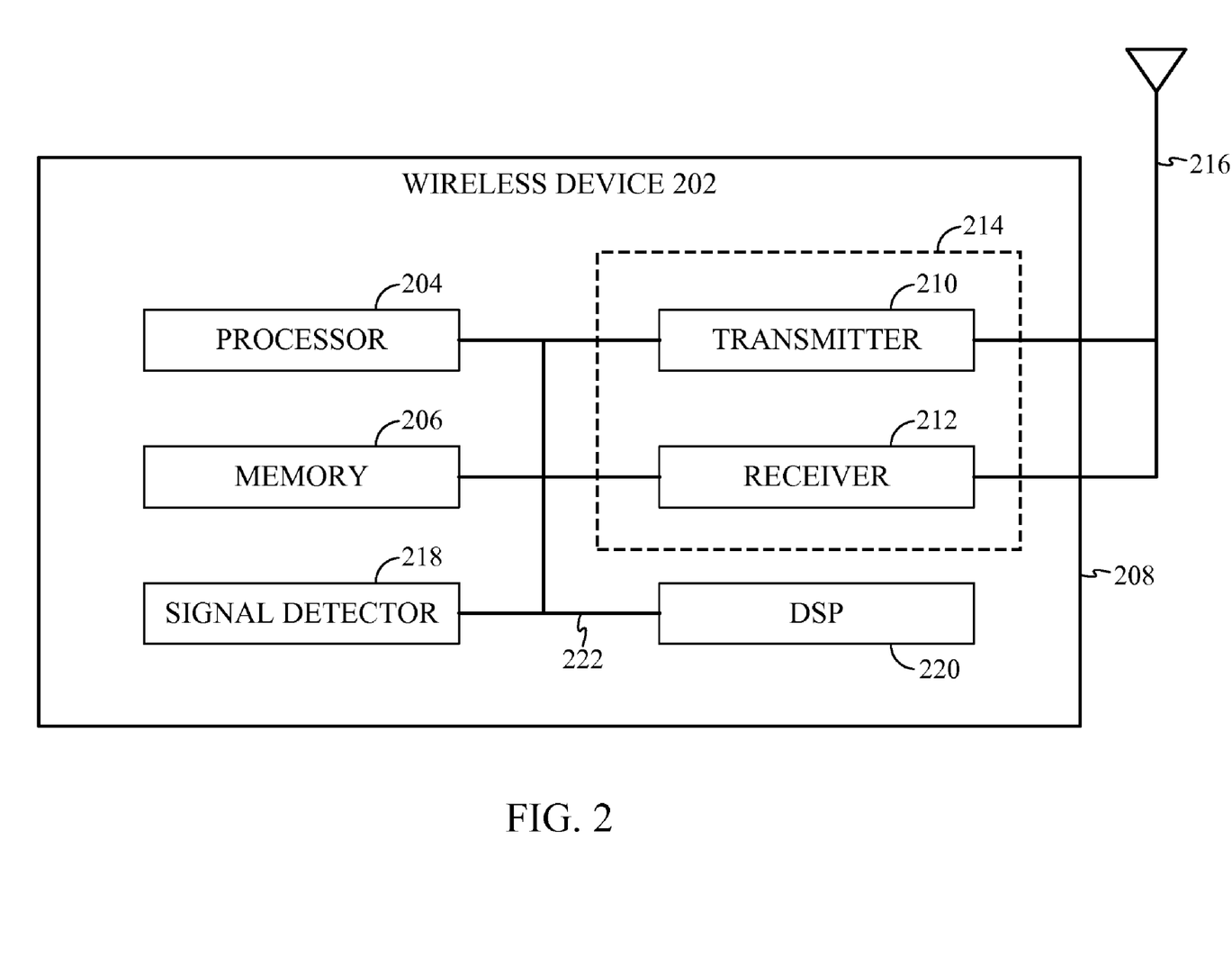
FIG. 2 illustrates various components that may be utilized in a wireless device in accordance with certain embodiments of the present disclosure.

FIG. 2 illustrates various components that may be utilized in a wireless device 202 that may be employed within the wireless communication system 100. The wireless device 202 is an example of a device that may be configured to implement the various methods described herein. The wireless device 202 may be a base station 104 or a user terminal 106.

The wireless device 202 may include a processor 204 which controls operation of the wireless device 202. The processor 204 may also be referred to as a central processing unit (CPU). Memory 206, which may include both read-only memory (ROM) and random access memory (RAM), provides instructions and data to the processor 204. A portion of the memory 206 may also include non-volatile random access memory (NVRAM). The processor 204 typically performs logical and arithmetic operations based on program instructions stored within the memory 206. The instructions in memory 206 may be executable to implement methods described herein.

The wireless device 202 may also include a housing 208 that may include a transmitter 210 and a receiver 212 to allow transmission and reception of data between the wireless device 202 and a remote location. The transmitter 210 and receiver 212 may be combined into a transceiver 214. An antenna 216 may be attached to the housing 208 and electrically coupled to the transceiver 214. The wireless device 202 may also include (not shown) multiple transmitters, multiple receivers, multiple transceivers, and/or multiple antennas.

The wireless device 202 may also include a signal detector 218 that may be used in an effort to detect and quantify the level of signals received by the transceiver 214. The signal detector 218 may detect such signals as total energy, pilot energy per subcarrier per symbol, power spectral density and other signals. The wireless device 202 may also include a digital signal processor (DSP) 220 for use in processing signals.

The various components of the wireless device 202 may be coupled together by a bus system 222, which may include a power bus, a control signal bus, and a status signal bus in addition to a data bus.

Figure 3:
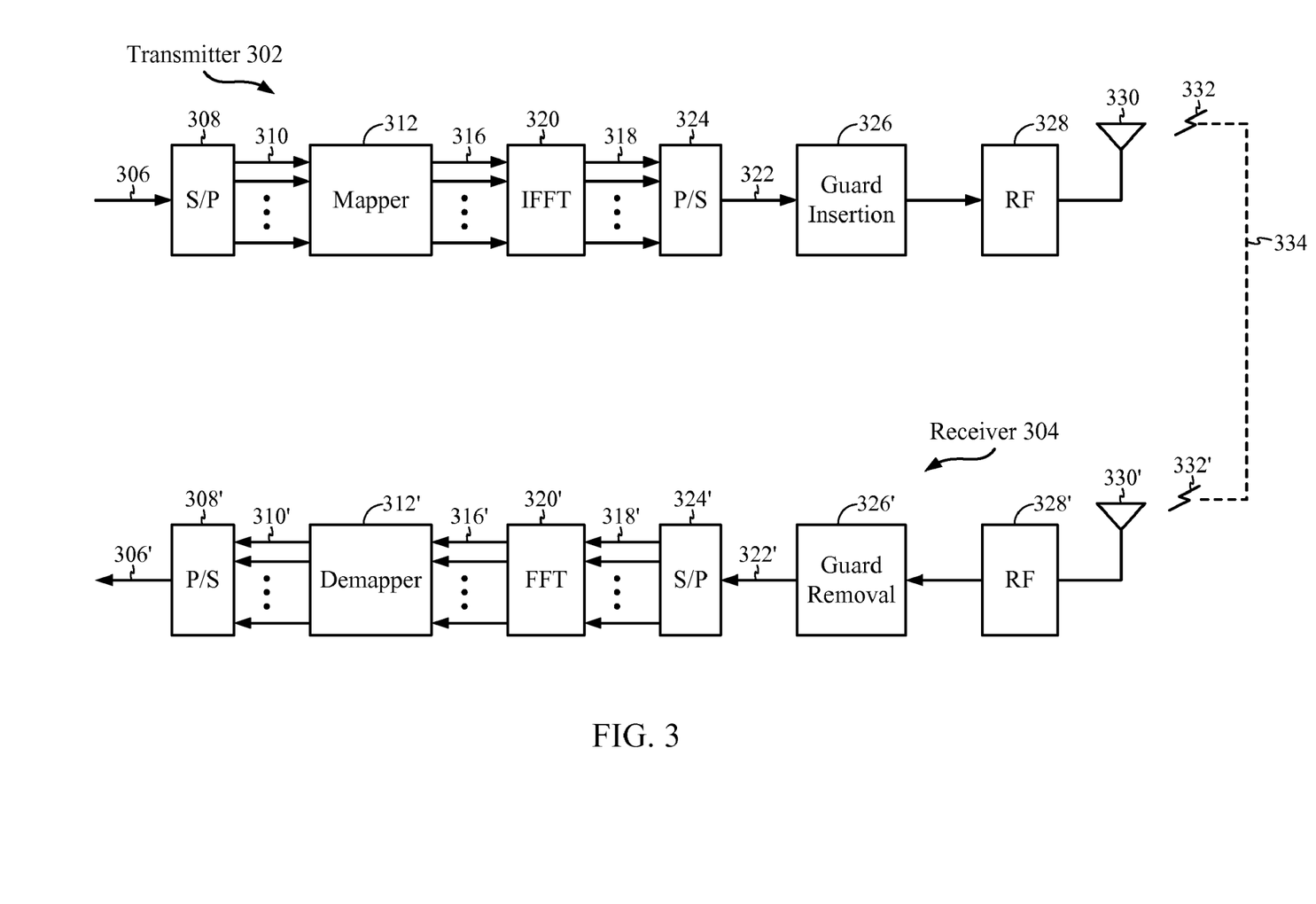
FIG. 3 illustrates an example transmitter and an example receiver that may be used within a wireless communication system that utilizes orthogonal frequency-division multiplexing (OFDM) and orthogonal frequency division multiple access (OFDMA) technology in accordance with certain embodiments of the present disclosure.

FIG. 3 illustrates an example of a transmitter 302 that may be used within a wireless communication system 100 that utilizes OFDM/OFDMA. Portions of the transmitter 302 may be implemented in the transmitter 210 of a wireless device 202. The transmitter 302 may be implemented in a base station 104 for transmitting data 306 to a user terminal 106 on a downlink 108. The transmitter 302 may be implemented in a user terminal 106 for transmitting data 306 to a base station 104 on an uplink 110.

Data 306 to be transmitted is shown being provided as input to a serial-to-parallel (S/P) converter 308. The S/P converter 308 may split the transmission data into N parallel data streams 310.

The N parallel data streams 310 may then be provided as input to a mapper 312. The mapper 312 may map the N parallel data streams 310 onto N constellation points. The mapping may be done using some modulation constellation, such as binary phase-shift keying (BPSK), quadrature phase-shift keying (QPSK), 8 phase-shift keying (8PSK), quadrature amplitude modulation (QAM), etc. Thus, the mapper 312 may output N parallel symbol streams 316, each symbol stream 316 corresponding to one of the N orthogonal subcarriers of the inverse fast Fourier transform (IFFT) 320. These N parallel symbol streams 316 are represented in the frequency domain and may be converted into N parallel time domain sample streams 318 by an IFFT component 320.

A brief note about terminology will now be provided. N parallel modulations in the frequency domain are equal to N modulation symbols in the frequency domain, which are equal to N mapping and N-point IFFT in the frequency domain, which is equal to one (useful) OFDM symbol in the time domain, which is equal to N samples in the time domain. One OFDM symbol in the time domain, Ns, is equal to Ncp (the number of guard samples per OFDM symbol)+N (the number of useful samples per OFDM symbol).

The N parallel time domain sample streams 318 may be converted into an OFDM/OFDMA symbol stream 322 by a parallel-to-serial (P/S) converter 324. A guard insertion component 326 may insert a guard interval between successive OFDM/OFDMA symbols in the OFDM/OFDMA symbol stream 322. The output of the guard insertion component 326 may then be upconverted to a desired transmit frequency band by a radio frequency (RF) front end 328. An antenna 330 may then transmit the resulting signal 332.

FIG. 3 also illustrates an example of a receiver 304 that may be used within a wireless device 202 that utilizes OFDM/OFDMA. Portions of the receiver 304 may be implemented in the receiver 212 of a wireless device 202. The receiver 304 may be implemented in a user terminal 106 for receiving data 306 from a base station 104 on a downlink 108. The receiver 304 may also be implemented in a base station 104 for receiving data 306 from a user terminal 106 on an uplink 110.

The transmitted signal 332 is shown traveling over a wireless channel 334. When a signal 332' is received by an antenna 330', the received signal 332' may be downconverted to a baseband signal by an RF front end 328'. A guard removal component 326' may then remove the guard interval that was inserted between OFDM/OFDMA symbols by the guard insertion component 326.

The output of the guard removal component 326' may be provided to an S/P converter 324'. The S/P converter 324' may divide the OFDM/OFDMA symbol stream 322' into the N parallel time-domain symbol streams 318', each of which corresponds to one of the N orthogonal subcarriers. A fast Fourier transform (FFT) component 320' may convert the N parallel time-domain symbol streams 318' into the frequency domain and output N parallel frequency-domain symbol streams 316'.

A demapper 312' may perform the inverse of the symbol mapping operation that was performed by the mapper 312 thereby outputting N parallel data streams 310'. A P/S converter 308' may combine the N parallel data streams 310' into a single data stream 306'. Ideally, this data stream 306' corresponds to the data 306 that was provided as input to the transmitter 302. Note that elements 308', 310', 312', 316', 320', 318' and 324' may all be found on a in a baseband processor.

Exemplary Technique for Decoding BS Broadcast Paging Messages

Under current versions of the IEEE 802.16 standard, a WiMAX BS may attempt to page a WiMAX MS by including a MOB_PAG-ADV message as the payload of a MAC protocol data unit (MPDU) broadcast. Unfortunately, the reception and decoding of MOB_PAG-ADV messages is often hindered as a result of bit errors. For example, certain conditions may result in poor quality on a channel through which the MOB_PAG-ADV messages is broadcast. If there is even a single bit error between the MPDU sent and the MPDU received, the subsequent cyclic redundancy check (CRC) on the MPDU will fail. In traditional applications, the MS may simply drop the entire MPDU if the CRC fails.

The failure of the MS to properly receive a MOB_PAG-ADV message often results in expensive capacity loss and network performance degradation. For instance, after a paging controller in an access service network (ASN) fails to receive an expected paging response, the paging controller may request all of its subordinate BSs to broadcast another MPDU with an identical MOB_PAG-ADV message. This may require additional transmission bandwidth for all of the BSs involved in the re-broadcast. As a result, the paging response may be delayed and the MS may miss a call.

However, when the CRC of an MPDU containing a MOB_PAG-ADV message fails, it does not mean all of the message fields contain bit errors. Some of the information may still be error free. Accordingly, embodiments of the present disclosure propose parsing and continuing to decode MPDUs with MOB_PAG-ADV messages although the corresponding CRC failed.

Figure 4:
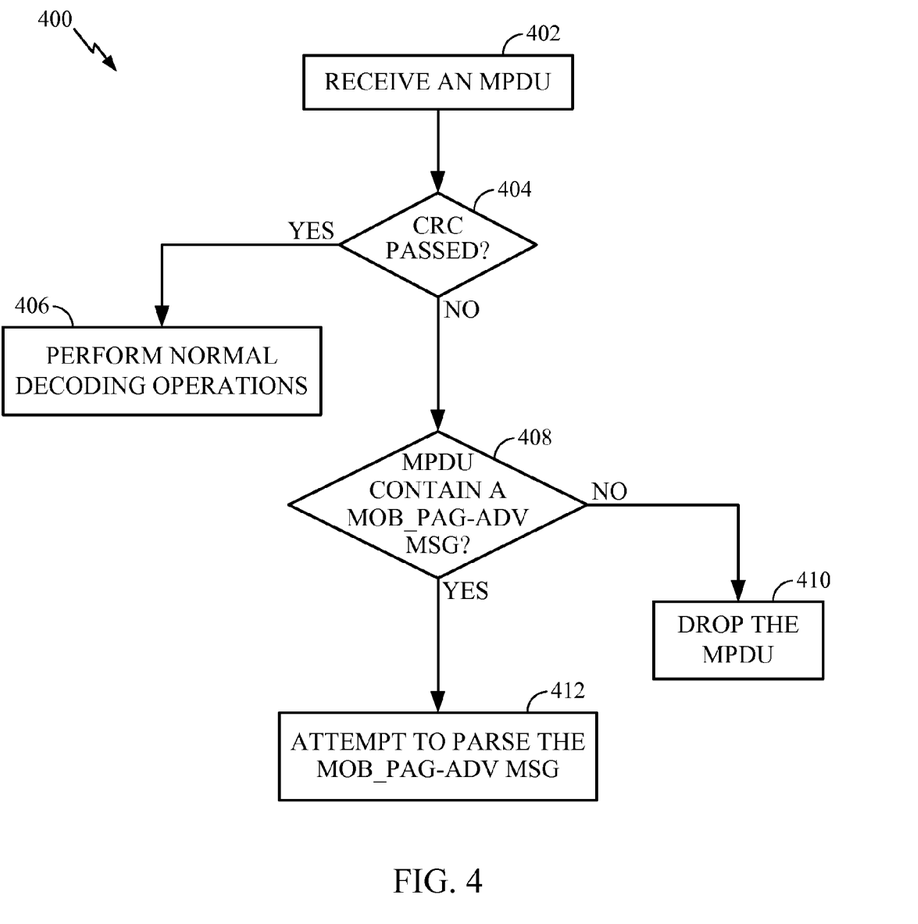
FIG. 4 illustrates example operations for processing MAC protocol data units (PDUs) which include MOB_PAG-ADV messages.

FIG. 4 illustrates example operations for addressing MPDUs which include MOB_PAG-ADV messages. The operations 400 may be performed, for example, by an MS in an effort to improve the success rate of BS broadcast paging and to reduce the bandwidth capacity loss associated with unnecessarily re-broadcasting MOB_PAG-ADV messages.

Figure 5A:
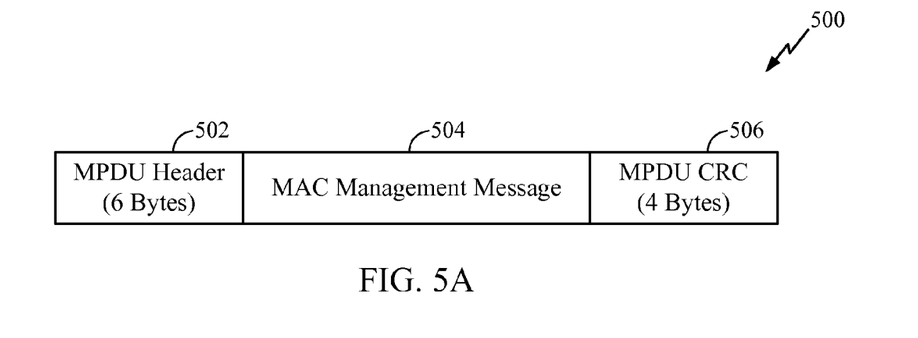
FIG. 5A illustrates an example MAC protocol data unit.

Operations 400 begin, at 402, with the MS receiving a broadcast MPDU. As illustrated in FIG. 5A, an MPDU 500 may include a 6 byte MPDU header 502, a payload of one or more MAC management messages 504, and a 4 byte MPDU CRC 506.

At 404, the MPDU CRC field is evaluated, verifying the integrity of the received message. If the message passes the CRC test, the MS may perform normal decoding operations, as illustrated at 406.

However, if the received message fails the CRC evaluation, the MS, at 408, may proceed to determine if the MPDU contains a MOB_PAG-ADV message, in accordance with embodiments of the present disclosure. In contrast, a conventional MS would drop the entire MPDU if the received message failed the CRC evaluation.

To determine if the MPDU contains a MOB_PAG-ADV message, the MS may evaluate a 16-bit Connection ID (CID) field in the MPDU header. Since the MOB_PAG-ADV message may be broadcast by a BS to a plurality of MSs, an MPDU with a MOB_PAG-ADV message may be sent using an idle mode multicast connection, for example, denoted in the MPDU header with a CID value of 0xFFFC, or a broadcast connection, denoted with a CID value of 0xFFFF.

Figure 5B:
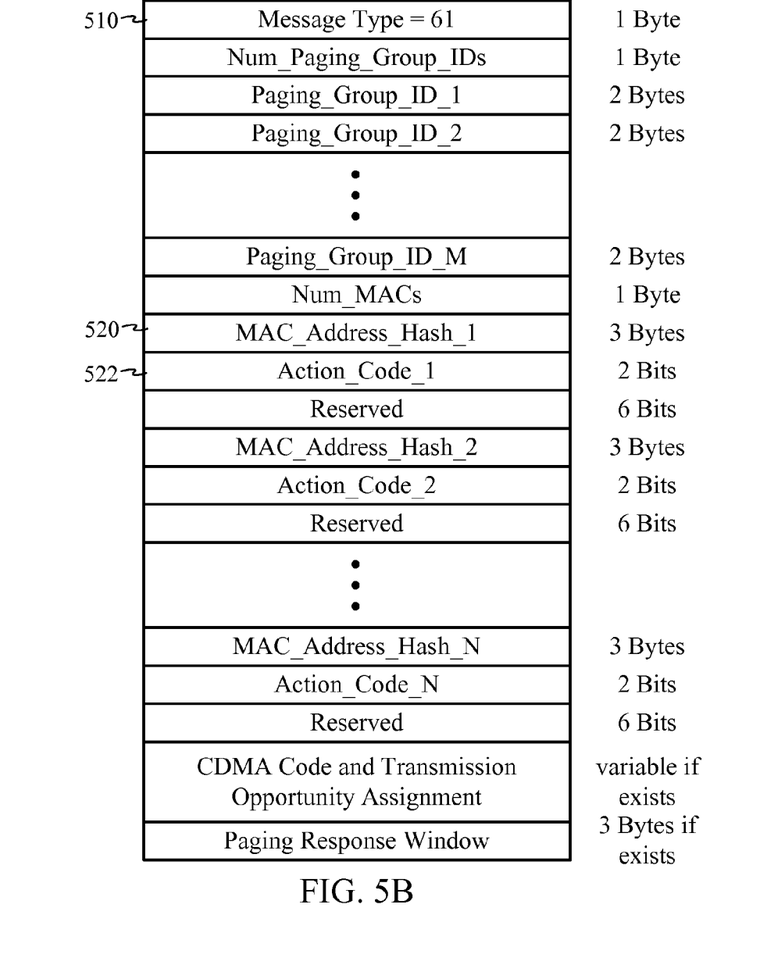
FIG. 5B illustrates a general format of a broadcast paging message.

Additionally, the MS may look to the first byte of the MPDU payload to determine if the MPDU contains a MOB_PAG-ADV message at 408. As illustrated in FIG. 5B, the first byte of certain MAC management messages may be a Message Type Field. From this field, the MS may determine whether or not the MPDU contains a MOB_PAG-ADV message. For example, a message type field value of '61' may indicate the subsequent MAC management message is a MOB_PAG-ADV message.

If the MPDU does not contain a MOB_PAG-ADV message, the MS may drop the MPDU, at 410. However, if the MPDU contains a MOB_PAG-ADV message, the MS, at 412, may attempt to parse the MOB_PAG-ADV message.

With respect to a specific MS, the key information in a MOB_PAG-ADV message may be the MAC address hash 520 and the subsequent action code 522, as illustrated in FIG. 5B. A single MOB_PAG-ADV message may include one or more MAC address hashes 520 and corresponding action codes 522. Additionally, a MOB_PAG-ADV message may contain several other fields of less interest to an MS. Accordingly, when there are only a few bit errors, the MAC address hash 520 and action code 522 relevant to a specific MS may not be affected.

Figure 6:
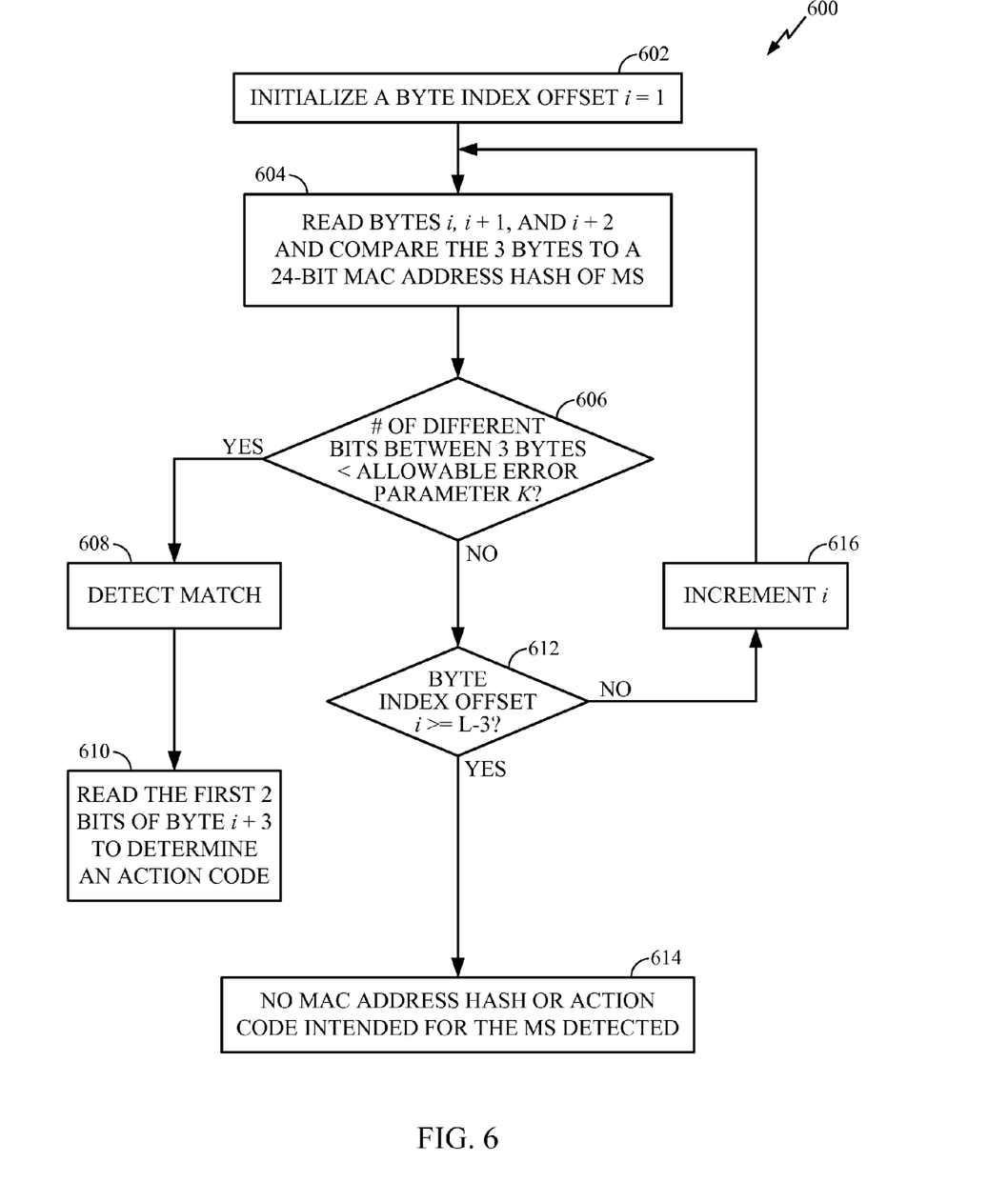
FIG. 6 illustrates example operations for attempting to parse a MOB_PAG-ADV message included in a MPDU, in accordance with certain embodiments of the present disclosure.

FIG. 6 illustrates example operations for attempting to parse a MOB_PAG-ADV message included in a MPDU. The operations 600 may be performed, for example, by an MS in an effort to identify uncorrupted MAC address hashes and corresponding action codes and determine whether or not they are applicable to the MS.

Operations 600 begin, at 602, with the MS initializing a byte index offset i equal to 1, where the byte index offset i is the offset from the starting of the MOB_PAG-ADV message. That is, i=0 is the Message Type field.

At 604, the MS may read three bytes (i, i+1, and i+2) from the MOB_PAG-ADV message and compare the three bytes to a 24-bit MAC address hash associated with the MS. At 606, the MS may determine if the number of bits that differ between the three read bytes and the 24-bit MAC address hash is less than a parameter K.

The parameter K is a design parameter that may be used to allow the MS to detect a match between the 3 previously read bytes and the MAC address hash so long as there are fewer than K bit errors.

The value K may be a design choice. For example, in selecting K it may be prudent to select a small number because certain other information fields may, with a non negligible probability, resemble the MAC address hash of the paged MS within several bits.

Specifically, assuming an equally random 0 or 1 bit pattern, the probability P of an arbitrary three bytes in the received MOB_PAG-ADV message resembling a specific MS MAC address hash with fewer than K different bits may be described by Equation 1:

$$P = (L-3) * \sum_{j=0}^{K-1} C_j^{24} * (1/2)^{24}, \quad (1)$$

where L is the length of the MPDU payload in bytes. For example, if K=3 and L=100 bytes, the probability of an arbitrary 3 bytes resembling a specific MS MAC address hash with fewer than K different bits is 0.002, while if K=2 the probability of a resemblance drops to 0.0001.

If the MS determines the number of bits that vary between the three read bytes and the 24-bit MAC address hash to be less than a parameter K, then, at 608, the MS may detect a match. After detecting a match, the MS may proceed, at 610, to read the first two bits of i+3 to determine an action code.

When MS detects a match, the MS may proceed to execute the protocols according to action code. However, in some instances the error may occur in the action code field. In such instances, the MS may either perform the actions corresponding to the bit values, as established under the IEEE 802.16 standard, or perform a set of revised actions. For example, if the action code field has a value of 0b00, 0b01, or 0b11, the MS may perform a ranging function to establish location update. While, if the action code field has a value of 0b10, the MS may perform network entry to establish a mobile terminated call. As an example of revised actions, an MS may always perform a ranging function to establish location update regardless of the action code value.

Since the CDMA code and transmission opportunity assignment TLV and paging response window TLV include the information of all paged MS with an action code field value equal to 0b01 or 0b10, there may be instances in which it is beneficial for the MS to decode the action codes of all MAC address hashes correctly in order to use the dedicated ranging resource. However, these fields are optional and the BS may not include them. Accordingly, certain embodiments of the disclosure propose to ignore these fields and perform only the contention-based initial ranging for location update or network entry.

In the case that a mobile terminated call is to be established, the BS may set a Location Update Response TLV to 0x03 indicating, e.g., that the location update was successful and there is pending DL traffic. Accordingly, a mobile terminated call may still be signaled to the MS even if MS performs the location update procedure.

In contrast, if the MS determines the number of bits that vary between the three read bytes and the 24-bit MAC address hash to be greater than or equal to the parameter K, then, at 612, the MS may fail to detect a match and evaluate the byte index offset i. If the byte index offset i is greater than or equal to L−3, where L is still the length of the MPDU payload in bytes, the MS, at 614, may determine that there was not a MAC address hash or action code intended for the MS.

However, if the byte index offset i is less than L−3, the MS, at 616, may increment i and repeat steps 604-612 until either the MS determines the number of bits that vary between the three read bytes and the 24-bit MAC address hash are less than a parameter K or the byte index offset i becomes greater than or equal to L−3.

It should be noted that although the first 3 or more bytes of a MOB_PAG-ADV message may be bytes corresponding to paging group IDs and, therefore, may not include an action code specific to an MS, this is okay because the MS should not detect a match between the MAC address hash associated with the MS and the previously read bytes. Therefore, the MS should continue on with operations 600 as if the number of bits that vary between the three read bytes and the 24-bit MAC address hash is greater than the parameter K, as previously described.

Figure 4A:
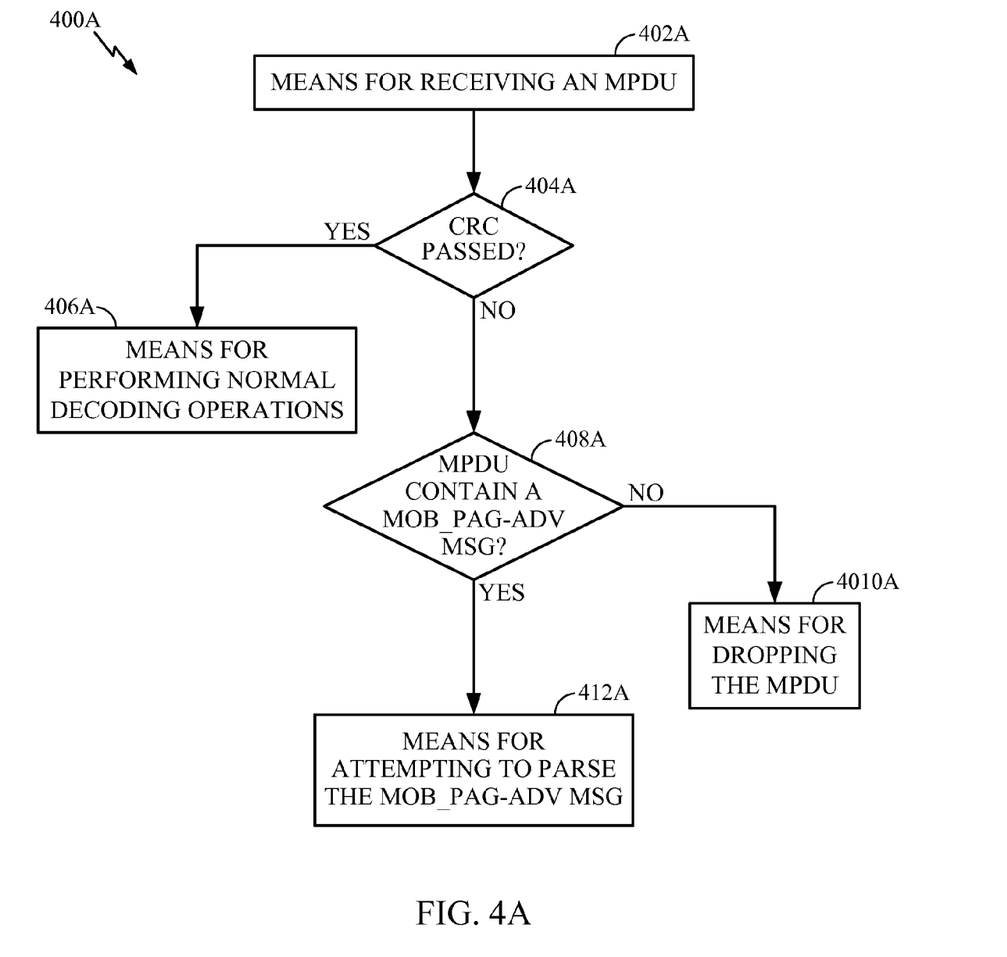
FIG. 4A is a block diagram of components capable of performing the example operations of FIG. 4.
Figure 6A:
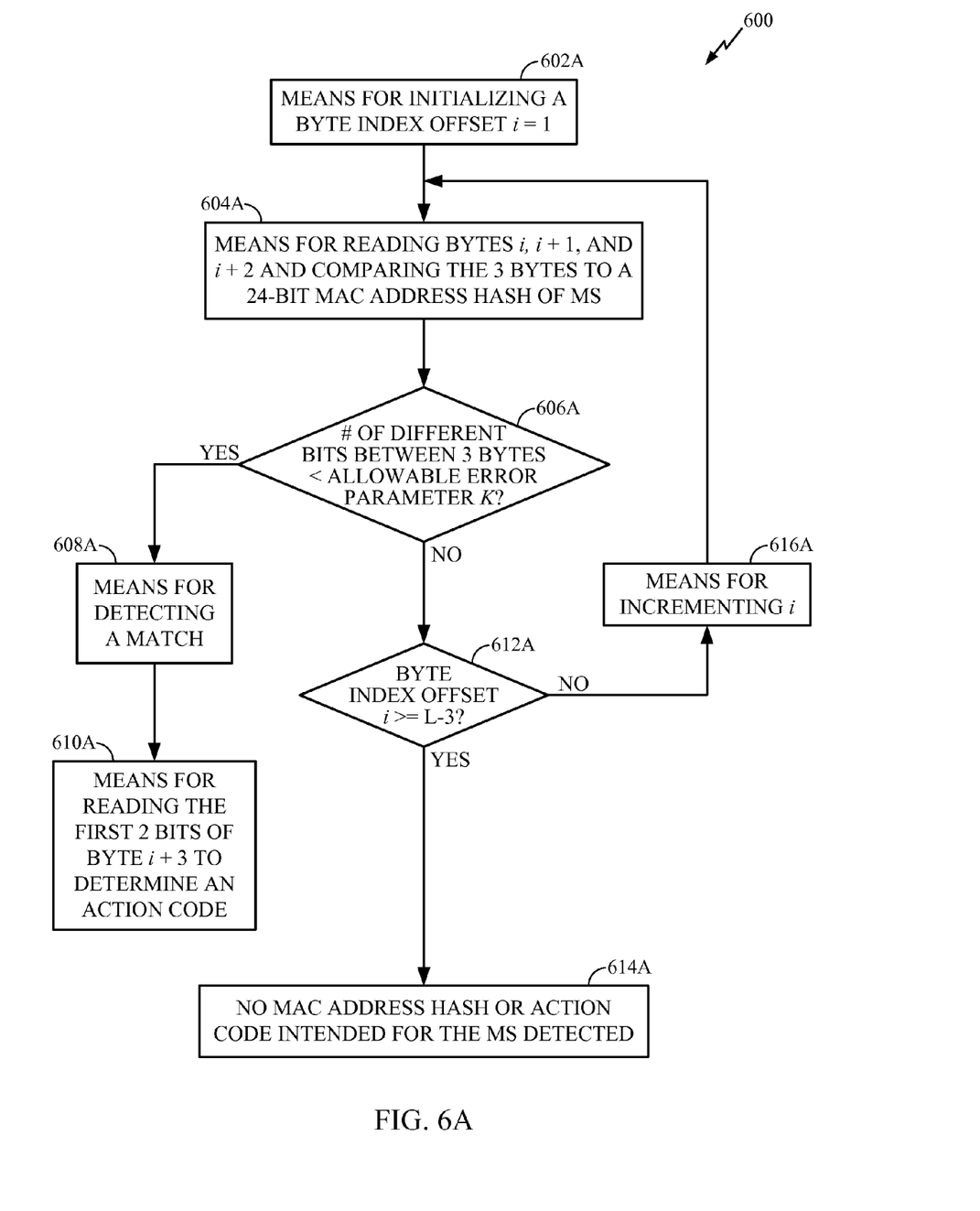
FIG. 6A is a block diagram of components capable of performing the example operations of FIG. 6.

The various operations of methods described above may be performed by various hardware/software component(s) and/or module(s) corresponding to means-plus-function blocks illustrated in the Figures. Generally, where there are methods illustrated in Figures having corresponding counterpart means-plus-function Figures, the operation blocks correspond to means-plus-function blocks with similar numbering. For example, blocks 402-412 illustrated in FIG. 4 correspond to means-plus-function blocks 402A-412A illustrated in FIG. 4A. Additionally, blocks 602-616 illustrated in FIG. 6 correspond to means-plus-function blocks 602A-616A illustrated in FIG. 6A.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

Information and signals may be represented using any of a variety of different technologies and techniques. For example, data, instructions, commands, information, signals and the like that may be referenced throughout the above description may be represented by voltages, currents, electromagnetic waves, magnetic fields or particles, optical fields or particles or any combination thereof.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device, discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core or any other such configuration.

The steps of a method or algorithm described in connection with the present disclosure may be embodied directly in hardware, in a software module executed by a processor or in a combination of the two. A software module may reside in any form of storage medium that is known in the art. Some examples of storage media that may be used include RAM memory, flash memory, ROM memory, EPROM memory, EEPROM memory, registers, a hard disk, a removable disk, a CD-ROM and so forth. A software module may comprise a single instruction, or many instructions, and may be distributed over several different code segments, among different programs and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein, such as those illustrated in the Figures, can be downloaded and/or otherwise obtained by a mobile device and/or base station as applicable. For example, such a device can be coupled to a server to facilitate the transfer of means for performing the methods described herein. Alternatively, various methods described herein can be provided via a storage means (e.g., random access memory (RAM), read only memory (ROM), a physical storage medium such as a compact disc (CD) or floppy disk, etc.), such that a mobile device and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims While the foregoing is directed to embodiments of the present disclosure, other and further embodiments of the disclosure may be devised without departing from the basic scope thereof, and the scope thereof is determined by the claims that follow.

What is claimed is:

1. A method operable by a mobile station (MS) for processing a Media Access Control Protocol Data Unit (MPDU), comprising:
   receiving the MPDU from a base station (BS) via a receiver of the MS;
   determining whether the MPDU has at least one bit error;
   in response to the MPDU having the at least one bit error, determining whether the MPDU contains a BS broadcast paging (MOB_PAG-ADV) message; and
   parsing the MOB_PAG-ADV message in response to the MPDU containing a MOB_PAG-ADV message, wherein the parsing the MOB_PAG-ADV message comprises determining an action code upon determining that a number of bit errors between a portion of the MOB_PAG-ADV message and a MAC address hash associated with the MS is less than an allowable error parameter value.

2. The method of claim 1, wherein determining whether the MPDU contains a MOB_PAG-ADV message comprises:
   evaluating whether or not a header of the MPDU has a connection ID (CID) field value corresponding to a multicast or a broadcast connection; and
   evaluating whether or not a payload of the MPDU has a message type field value equal to 61.

3. The method of claim 1, wherein parsing the MOB_PAG-ADV message comprises:
   initializing a byte index offset i;
   reading bytes i, i+1, i+2 and comparing said bytes to the MAC address hash;
   comparing a number of bit errors between the three bytes and the MAC address hash to the allowable error parameter value;
   reading a first and second bit of byte i+3 if the number of bit errors between the three bytes and the MAC address hash is less than the allowable error parameter value; and
   performing an action based at least on the action code indicated by the first and second bit of byte i+3.

4. The method of claim 3, further comprising:
   performing a location update regardless of a value of the action code.

5. The method of claim 3, wherein the allowable error parameter value is less than or equal to 2.

6. A mobile station (MS) for processing a Media Access Control Protocol Data Unit (MPDU), comprising:
   means for receiving the MPDU broadcasted from a base station (BS);

means for determining whether the MPDU has at least one bit error;

means for determining whether the MPDU contains a BS broadcast paging (MOB_PAG-ADV) message, in response to the MPDU having the at least one bit error; and means for parsing the MOB_PAG-ADV message in response to the MPDU containing a MOB_PAG-ADV message, wherein the parsing the MOB_PAG-ADV message comprises determining an action code upon determining that a number of bit errors between a portion of the MOB_PAG-ADV message and a MAC address hash associated with the MS is less than an allowable error parameter value.

7. The MS of claim 6, wherein the means for determining whether the MPDU contains a MOB_PAG-ADV message comprises:

means for evaluating whether a header of the MPDU has a connection ID (CID) field value corresponding to a multicast or a broadcast connection; and means for evaluating whether a payload of the MPDU has a message type field value equal to 61.

8. The MS of claim 6, wherein the means for parsing the MOB_PAG-ADV message comprises:

means for initializing a byte index offset i;

means for reading bytes i, i+1, i+2 and comparing said bytes to the MAC address hash;

means for comparing a number of bit errors between the three bytes and the MAC address hash to the allowable error parameter value;

means for reading a first and second bit of byte i+3 if the number of bit errors between the three bytes and the MAC address hash is less than the allowable error parameter value; and means for performing an action based at least on the action code indicated by the first and second bit of byte i+3.

9. The MS of claim 8, further comprising:

means for performing a location update regardless of a value of the action code.

10. The MS of claim 8, wherein the allowable error parameter value is less than or equal to 2.

11. A mobile station (MS) for processing a Media Access Control Protocol Data Unit (MPDU), comprising:

at least one processor;

a receiver coupled to the at least one processor and configured to receive the MPDU broadcasted from a base station (BS);

a memory coupled to the processor and comprising:

instructions executable by the at least one processor to determine whether the MPDU has at least one bit error;

instructions executable by the at least one processor to determine whether the MPDU contains a BS broadcast paging (MOB_PAG-ADV) message, in response to the MPDU having the at least one bit error; and instructions executable by the at least one processor to parse the MOB_PAG-ADV message in response to the MPDU containing a MOB_PAG-ADV message, wherein the parsing the MOB_PAG-ADV message comprises determining an action code upon determining that a number of bit errors between a portion of the MOB_PAG-ADV message and a MAC address hash associated with the MS is less than an allowable error parameter value.

12. The MS of claim 11, wherein the instructions executable by the at least one processor to determine whether the MPDU contains a MOB_PAG-ADV message comprises:

instructions executable by the at least one processor to evaluate whether a header of the MPDU has a connection ID (CID) field value corresponding to a multicast or a broadcast connection; and instructions executable by the at least one processor to evaluate whether a payload of the MPDU has a message type field value equal to 61.

13. The MS of claim 11, wherein the instructions executable by the at least one processor to parse the MOB_PAG-ADV message comprises:

instructions executable by the at least one processor to initialize a byte index offset i;

instructions executable by the at least one processor to read bytes i, i+1, i+2 and comparing said bytes to the MAC address hash;

instructions executable by the at least one processor to compare a number of bit errors between the three bytes and the MAC address hash to the allowable error parameter value;

instructions executable by the at least one processor to read a first and second bit of byte i+3 if the number of bit errors between the three bytes and the MAC address hash is less than the allowable error parameter value; and instructions executable by the at least one processor to perform an action based at least on the action code indicated by the first and second bit of byte i+3.

14. The MS of claim 13, further comprising:

instructions executable by the at least one processor to perform a location update regardless of a value of the action code.

15. The MS of claim 13, wherein the allowable error parameter value is less than or equal to 2.

16. A computer-program product, comprising a non-transitory computer readable medium having code for causing a computer of a mobile station (MS) to:

instruct a receiver of the computer to receive a Media Access Control Protocol Data Unit (MPDU) broadcasted from a base station (BS);

determine whether the MPDU has at least one bit error;

determine whether the MPDU contains a BS broadcast paging (MOB_PAG-ADV) message, in response to the MPDU having the at least one bit error; and parse the MOB_PAG-ADV message in response to the MPDU containing a MOB_PAG-ADV message, wherein the parsing the MOB_PAG-ADV message comprises determining an action code upon determining that a number of bit errors between a portion of the MOB_PAG-ADV message and a MAC address hash associated with the MS is less than an allowable error parameter value.

17. The computer-program product of claim 16, wherein the code for causing the computer to determine whether the MPDU contains a MOB_PAG-ADV message comprises:

code for causing the computer to evaluate whether a header of the MPDU has a connection ID (CID) field value corresponding to a multicast or a broadcast connection; and code for causing the computer to evaluate whether a payload of the MPDU has a message type field value equal to 61.

18. The computer-program product of claim 16, wherein the code for causing the computer to parse the MOB_PAG-ADV message comprises:

code for causing the computer to initialize a byte index offset i;

code for causing the computer to read bytes i, i+1, i+2 and comparing said bytes to the MAC address hash;

code for causing the computer to compare a number of bit errors between the three bytes and the MAC address hash to the allowable error parameter value;

code for causing the computer to read a first and second bit of byte i+3 if the number of bit errors between the three bytes and the MAC address hash is less than the allowable error parameter value; and code for causing the computer to perform an action based at least on the action code indicated by the first and second bit of byte i+3.

19. The computer-program product of claim 18, further comprising wherein the non-statutory computer readable medium further comprises code for causing the computer to:
  perform a location update regardless of a value of the action code.

20. The computer-program product of claim 18, wherein the allowable error parameter value is less than or equal to 2.

* * * * *